United States Patent [19]

Stone

[11] 3,801,050

[45] Apr. 2, 1974

[54] HELICOPTER HAUL-DOWN AND SECURING SYSTEM

[75] Inventor: Walter N. Stone, Bloomfield, Conn.

[73] Assignee: Kaman Aerospace Corporation, Bloomfield, Conn.

[22] Filed: Feb. 23, 1973

[21] Appl. No.: 335,110

[52] U.S. Cl. ............................... 244/115, 114/43.5
[51] Int. Cl. ............................................. B64f 1/12
[58] Field of Search..... 244/115, 116, 114 R, 17.17, 244/17.11; 114/43.5

[56] References Cited
UNITED STATES PATENTS

| | | | |
|---|---|---|---|
| 2,471,544 | 5/1949 | Ring | 244/115 |
| 1,448,089 | 3/1923 | Scott | 244/115 |
| 1,634,964 | 7/1927 | Steinmetz | 244/115 |
| 1,389,925 | 9/1921 | Zurovec | 244/17.17 |
| 1,619,680 | 3/1927 | Richmond et al. | 244/115 |
| 2,453,857 | 11/1948 | Platt et al. | 244/17.17 |

Primary Examiner—George E. A. Halvosa
Assistant Examiner—Paul E. Sauberer
Attorney, Agent, or Firm—Cushman, Darby & Cushman

[57] ABSTRACT

A system for hauling down and securing a helicopter or the like with a haul down cable loop which attaches at one point to the helicopter and at another point to a deck winch. The cable loop passes through the deck at two separated locations via swivel sheaves so that while the helicopter is being hauled down, the cable acts like a single cable, exerting a downward force and, after the helicopter is on the deck, exerts both vertical and lateral forces to secure the helicopter on the deck. The cable loops over a draw sheave below deck, which is connected to the winch by a draw line so that the haul down cable is free to run over the draw sheave to equalize tension during haul down. After landing, the sheaves and cables would be locked by suitable braking means so that the two cables from the helicopter to the deck-mounted sheaves can restrain the helicopter.

6 Claims, 3 Drawing Figures

PATENTED APR 2 1974 3,801,050

HELICOPTER HAUL-DOWN AND SECURING SYSTEM

The invention relates to a system for hauling down and securing a helicopter or the like.

Landing a helicopter on a small deck, particularly on a ship, can be a very difficult and tricky operation. To minimize accidents, this is usually accomplished with the aid of a securing system in which a haul-down cable is attached to the helicopter, usually after being obtained from the deck by a messenger cable lowered by the helicopter. A deck-mounted winch is then used to haul-down the helicopter to the deck level and to secure it. The U.S. Pat. Nos. to Ring, 2,471,544, and Stewart et al., 3,303,807, describe securing systems of this type.

One difficulty with systems of this type is that, while they do adequately and safely pull the helicopter down to the deck, they do not provide sufficient lateral support for the helicopter while it is on the deck and during the last few feet of descent impart severe side loads to the helicopter. Some auxiliary arrangement must therefore be used to laterally secure the helicopter on the deck, or the risk of damage through lateral movement must be borne.

The present invention relates to a simple haul-down and securing system of this general type in which a cable loop is employed to haul down the helicopter, exerting a substantially vertically downward force while the helicopter is descending, and at the same time exerting a force having both vertical and lateral horizontal components during the last few feet of descent of the helicopter and while the helicopter is on the deck to secure it both against vertical and lateral movement. During the last few feet of descent, if the helicopter is within the two points of cable pull, the two lateral components become subtractive. This results in the salutary effect of low lateral loads on the landing gear upon touchdown.

According to the embodiment described in detail below, this is accomplished through the use of a cable loop which passes through the deck onto which the helicopter lands at two separated locations and which attaches to a winch below the deck. A pair of swivel sheaves also mounted below the deck adjacent where the respective cable portions pass through the deck guide the cable loop so that it extends substantially horizontally below the deck and substantially vertically above the deck. The cable runs over a draw sheave mounted below the deck which is in turn attached to a fixed winch by a draw line, so that the draw sheave and the cable loop can be pulled toward the winch as the draw line is wound about the winch to exert a downward force on the helicopter, hauling it down to the deck. The haul-down cable loop is free to run over the draw sheave in order to equalize tension on both portions of the cable exerting a force on the helicopter. Thus, as the helicopter is being drawn down, a substantially vertically downward force is exerted on the helicopter. However, during the last few feet of descent, the force exerted by the cable portions extending from the point of attachment of the cable loop to the helicopter have both horizontal and vertical components.

As the helicopter approaches the deck, the vertical component decreases, and the horizontal components increase. This fact results in two principal benefits: a softer landing due to the lessening of the vertical component, and centering the helicopter, should there be an imbalance in the horizontal components.

After landing, the cables may be locked by suitable means, thus restraining the helicopter in place.

Many other objects and purposes of the invention will be clear from the following detailed description of the drawings.

DETAILED DESCRIPTION OF THE DRAWINGS

Figure 1:
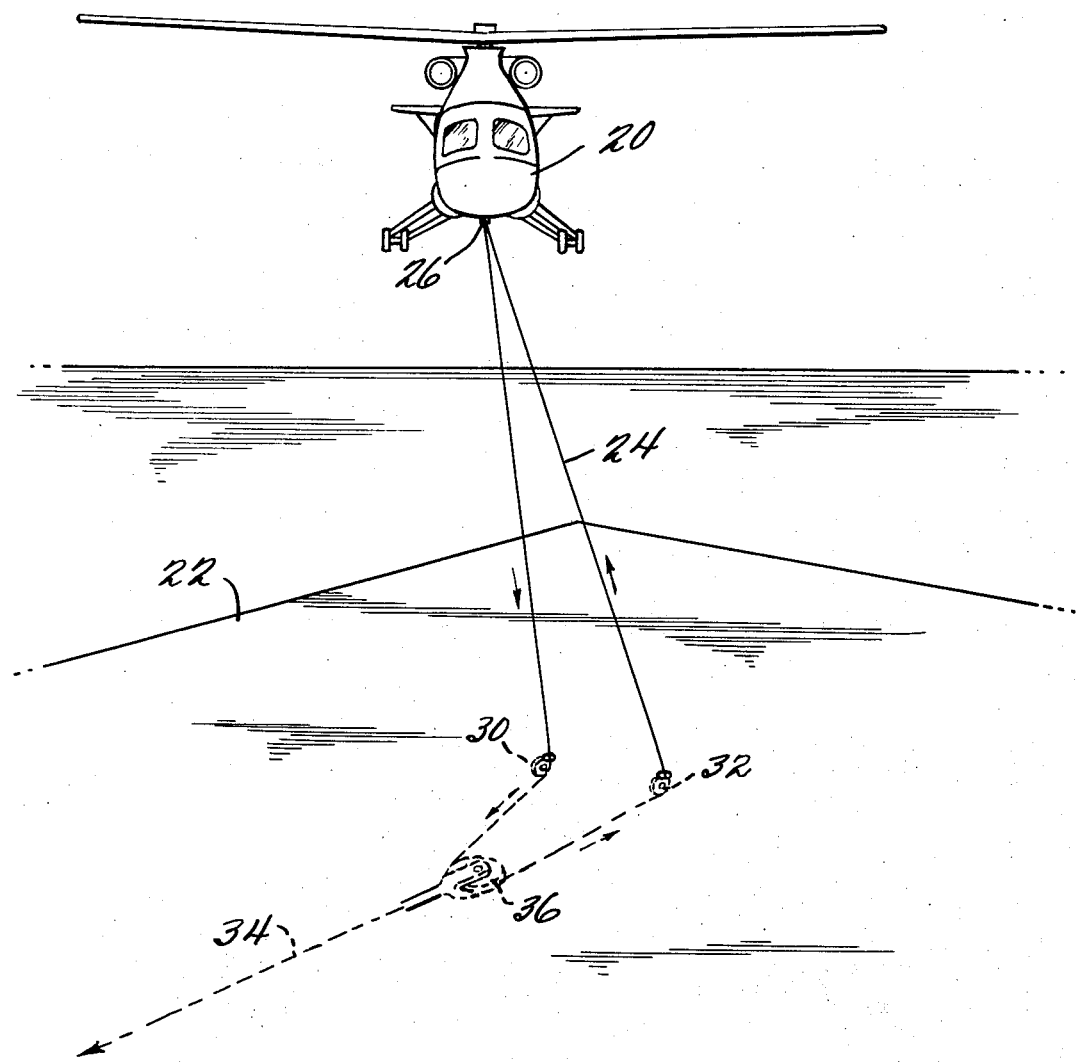
FIG. 1 shows a schematic view of the system of this invention in use hauling down a helicopter.

Reference is now made to FIG. 1 which illustrates a conventional helicopter 20 being drawn down to a conventional deck 22 which may be located on a ship or otherwise. As mentioned above, the system of this invention, as other similar systems in the past, includes a cable which is first raised to the helicopter by a messenger cable (not shown) lowered by helicopter 20 and attached to helicopter 20 at a point 26 by any conventional means.

Cable loop 24 is preferably swaged to form a "Y" swivel which in turn is attached to a ring (not shown). This ring can in turn be attached to the conventional external cargo hook, for example, with the aid of a pole pendant.

In contrast to prior art systems, however, the novel system of this invention employs a cable loop 24 of metal or other suitable material. Loop 24, as can be seen in FIG. 1, passes through deck 22 at two separated locations 30 and 32. Below deck 22, the direction of movement of cable 24 is shifted from the vertical to the horizontal, and cable 24 is coupled to a cable draw line 34 by means of a sheave or grooved pulley 36 about which cable 24 is free to run to equalize the force applied by the two portions of cable 24 extending from the point of attachment 26 of cable 24 to helicopter 20.

Figure 2:
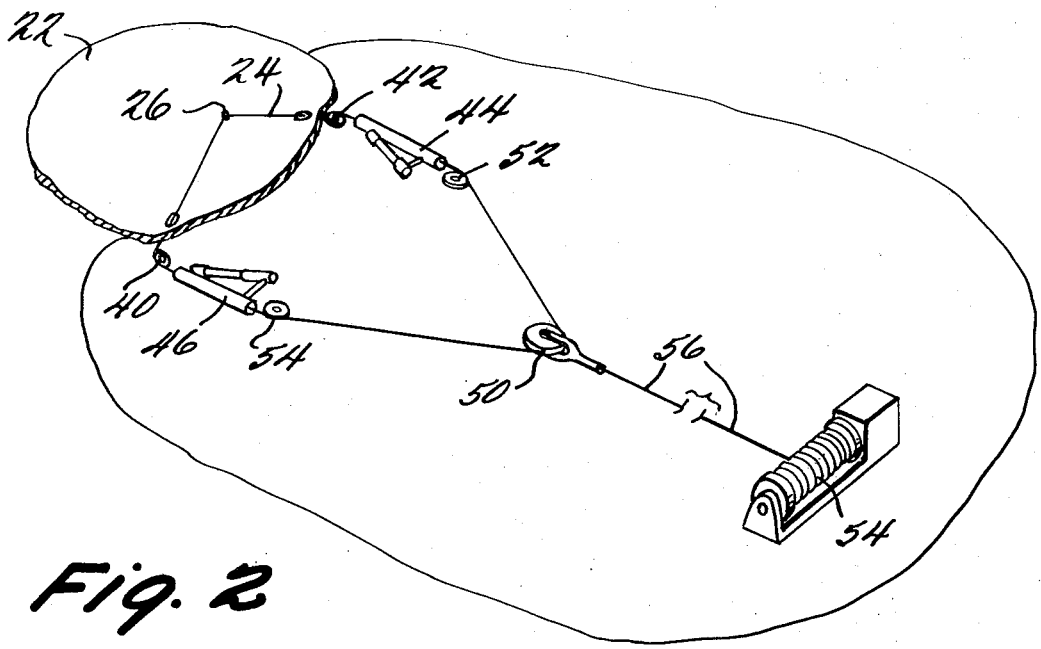
FIG. 2 shows a further system schematic illustrating how the components of this system operate to haul down and laterally and vertically secure the helicopter onto a deck.

Referring to the system schematic of FIG. 2, below deck 22 cable 24 passes over two conventional swivel sheaves 40 and 42 which are mounted conventionally underneath the deck. The cable next passes through two conventional cable locking actuators 44 and 46 which are employed after the helicopter is in place on the deck to lock the cable and hold the helicopter in position.

Figure 3:
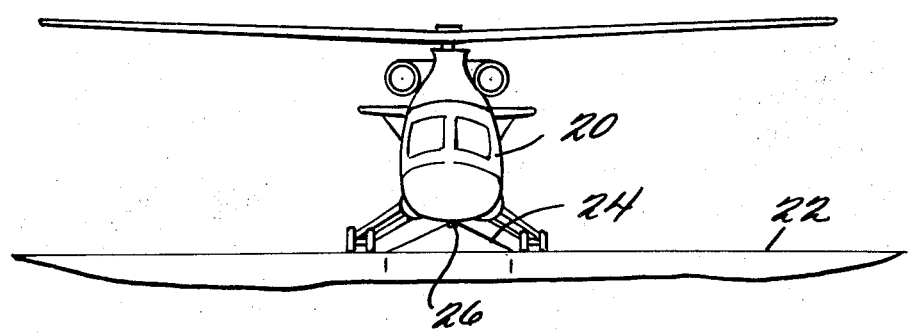
FIG. 3 shows a view of a conventional helicopter secured onto the deck.

Cable 24 next runs over draw sheave 50 via sheaves or pulleys 52 and 53, with draw sheave 50 being attached to a conventional below decks winch 54 via single draw line 56. Winch 54 during the hauling down of the helicopter winds draw line 56, exerting a constant, selectable force on draw line 56 which is communicated to cable 24 via sheave 50. Cable 24 in turn exerts a force on helicopter 20 pulling that helicopter down to the deck surface. As can be seen in FIG. 1, as the helicopter descends, the force exerted by the two portions of cable 24 extending from the point of attachment 26 to cable 24 to helicopter 20 are substantially vertical and the cable loop acts like a virtual single cable until the helicopter is a few feet above the deck level. At that time, as can be seen in FIG. 3, the two portions of cable 24 extending from the point of attachment 26 of cable 24 to helicopter 20 exert forces having substantial horizontal components. Since the two horizontal components exerted by the portions of the cable 24 are equal and opposite, the helicopter is secured laterally and vertically by the forces exerted by cable 24.

For most helicopters, the distance between the point of attachment 26 of cable 24 to helicopter 20 and the deck, when the helicopter is on the deck, will be roughly 1.5 feet. A separation between openings 30 and 32 of between 6 and 9 feet has been found to be particularly satisfactory, and a range of between the ratio of these two dimensions of between 4:1 to 6:1 is desired. Thus, for most helicopters, the separation between the deck openings is preferably 6–9 feet.

Many changes and modifications in the above described embodiment of the invention can, of course, be made without departing from the scope thereof. Accordingly, that scope is intended to be limited only by the scope of the appended claims.

What is claimed is:

1. A system for hauling down and securing a helicopter or the like on a deck comprising:
   a haul down cable loop,
   means for attaching said loop at one point to said helicopter,
   means for exerting a force on said loop so that the cable portions on both sides of the point of attachment of said loop to said helicopter exert a force on said helicopter to haul down said helicopter including a winch,
   means for connecting said force exerting means to said loop at a second point thereof including a draw sheave mounted with said loop running about said sheave freely to equalize the forces exerted by said cable portions on both sides of said point of attachment of said loop to said helicoper and a draw line connecting said draw sheave to said winch, and
   means for guiding the loop as said helicopter is hauled down so that said cable portions exert a substantially downward force while said helicopter is being hauled down and a force having a substantial horizontal component while said helicopter is on said deck.

2. A system as in claim 1 wherein said winch and draw sheave are mounted below said deck.

3. A system as in claim 1 further including said deck.

4. A system as in claim 1 wherein said deck has separated openings through which pass said portions of said cable on both sides of said point of attachment of said loop to said helicopter and wherein said guiding means includes first and second swivel sheaves mounted below said deck for each receiving and guiding a loop portion passing through one of said separated openings so that said cable portions extend substantially horizontally below said deck.

5. A system as in claim 4 wherein the ratio of the horizontal separation between said separated openings and the vertical distance between said deck and said point of attachment of said loop to said helicopter is between 4:1 and 6:1.

6. A system system as in claim 4 further including first and second cable actuators below said deck for locking said cable loop.

* * * * *